United States Patent [19]

Imamura et al.

[11] Patent Number: 5,189,574
[45] Date of Patent: Feb. 23, 1993

[54] FLEXIBLE INFORMATION STORING DISK APPARATUS HAVING LAMINAR AIR FLOW

[75] Inventors: Makoto Imamura, Hayama; Kazushi Tanimoto, Tokyo, both of Japan; Yoichiro Tanaka, Lauderdale, Minn.; Yoshiaki Sonobe, Ichikawa; Katsuyoshi Kitagawa, Yokohama, both of Japan

[73] Assignee: Kabushiki Kaisha Toshiba, Kawasaki, Japan

[21] Appl. No.: 431,387

[22] Filed: Nov. 3, 1989

[30] Foreign Application Priority Data

Nov. 4, 1988 [JP] Japan .................. 63-278794

[51] Int. Cl.$^5$ .............. G11B 5/60; G11B 15/64; G11B 17/32; G11B 21/20
[52] U.S. Cl. .................. 360/103; 360/130.34; 360/99.01; 360/106
[58] Field of Search .......... 360/106, 102, 103, 137, 360/104, 99.1, 130.34, 97.02, 130.3, 110

[56] References Cited

U.S. PATENT DOCUMENTS

| | | | |
|---|---|---|---|
| 3,688,285 | 8/1972 | Lawrence et al. | 360/102 |
| 3,729,720 | 4/1973 | Darling et al. | 360/102 |
| 3,731,292 | 5/1973 | Kelley | 360/130.34 |
| 3,852,820 | 12/1974 | Barbeau et al. | 360/99.01 |
| 3,879,757 | 4/1975 | Elliott et al. | 360/130.34 |
| 4,039,764 | 8/1977 | Bricot et al. | 360/102 |
| 4,071,854 | 1/1978 | Bijon et al. | 358/128 |
| 4,214,286 | 7/1980 | Ragle et al. | 360/130.34 |
| 4,419,704 | 12/1983 | Radman et al. | 360/102 |
| 4,613,966 | 9/1986 | Di Stefano et al. | 369/100 |
| 4,661,875 | 4/1987 | Kinjo | 360/133 |
| 4,794,482 | 12/1988 | Horio et al. | 360/130.34 |
| 4,803,578 | 2/1989 | Fujiwara | 360/103 |
| 4,912,582 | 3/1990 | Gomi et al. | 360/103 |
| 4,975,794 | 12/1990 | Losee et al. | 360/103 |

FOREIGN PATENT DOCUMENTS

| | | | |
|---|---|---|---|
| 60-193178 | 10/1985 | Japan | 360/103 |
| 61-107572 | 5/1986 | Japan | 360/97.02 |
| 62-117165 | 5/1987 | Japan | 360/130.34 |
| 63-200374 | 8/1988 | Japan . | |
| 1-204266 | 8/1989 | Japan | 360/103 |

Primary Examiner—John H. Wolff
Assistant Examiner—Alfonso Garcia
Attorney, Agent, or Firm—Oblon, Spivak, McClelland, Maier & Neustadt

[57] ABSTRACT

A magnetic or optical disk apparatus having a flexible disk rotated at high speed and head sliders for reading and writing information on the disk, floating from both sides of the disk. The disk apparatus is also provided with straightening plates for keeping air flow in the radial direction of the disk as a laminar flow to surely prevent the disk from being vibrated at the time when the disk is rotated at high speed. As the result, positions of the head sliders relative to the disk can be surely and accurately maintained to provide heads with excellent recording and reproducing characteristics. Mass storage and high speed access can be thus achieved without damaging the flexible disk and the disk apparatus can be smaller-sized with lighter weight and lower cost.

1 Claim, 16 Drawing Sheets

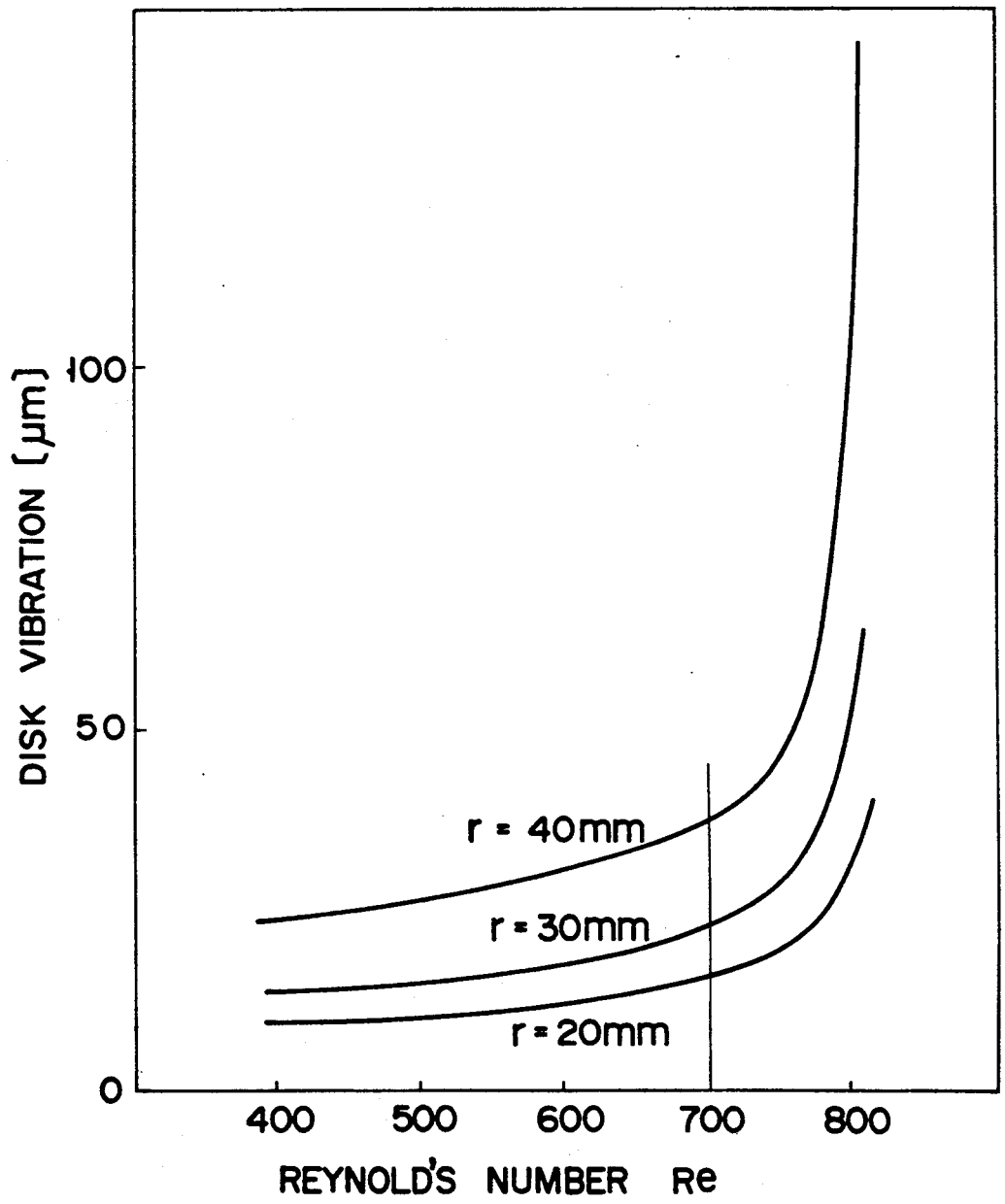
F I G. 6

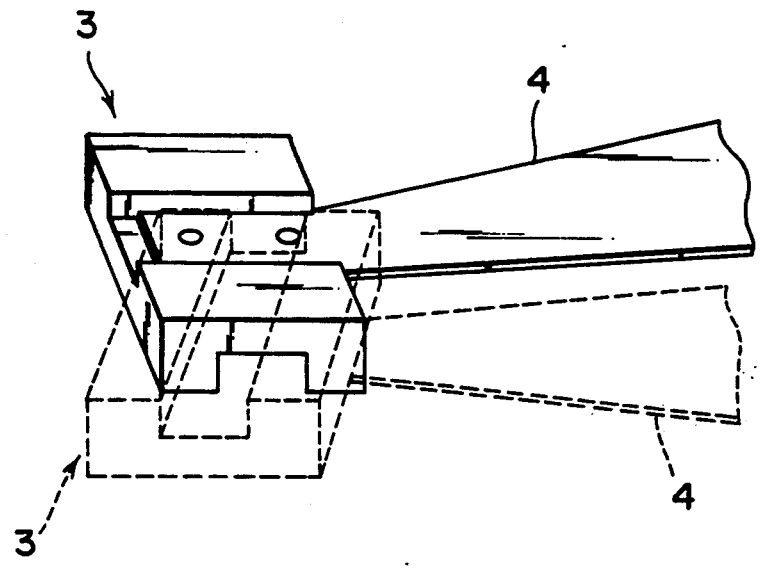
F I G. 24A
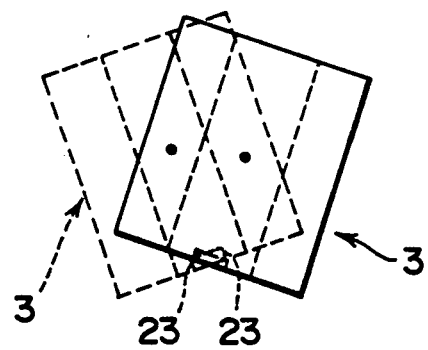
F I G. 24B

FLEXIBLE INFORMATION STORING DISK APPARATUS HAVING LAMINAR AIR FLOW

BACKGROUND OF THE INVENTION

1. Field of the Invention

The present invention relates to an information storing disk apparatus and more particularly, a magnetic or optical disk apparatus intended to use a flexible information storing disk.

2. Description of the Related Art

It has been asked these days that the magnetic disk apparatus can achieve mass storage and high speed access and be smaller-sized with lighter weight and lower cost.

The hard disk apparatus is well-known as being characteristic of mass storage and high speed access. In the case of this hard disk apparatus, however, the inertia of its hard disk medium is quite large. The spindle motor for rotating this hard disk medium becomes therefore extremely large in size and its rising time is long accordingly. Further, the hard disk apparatus usually uses floating head sliders and the hard disk medium is rigid. If magnetic heads of the head sliders strike against the hard disk medium, therefore, impact applied to the magnetic heads is quite large. In addition, the hard disk medium is comparatively high in its manufacturing cost.

Although the hard disk apparatus is characteristic of its mass storage and high speed access, it was difficult to make the device small in size and low in cost.

On the other hand, the floppy disk apparatus is well known as being small in size, light in weight and low in cost. It has been variously tried that the flexible magnetic disk for the floppy disk apparatus is rotated at high speed to achieve mass storage and high speed access as well as to make the device small in size and low in cost. However, the floppy disk apparatus is intended to read and write signals on and from the disk, keeping the magnetic head contacted with the flexible disk. When the flexible disk is rotated at high speed, therefore, the disk is remarkably damaged and the wearing of the disk is quite notable.

It was therefore difficult for the floppy disk apparatus to achieve mass storage and high speed access as well as to be made small in size, light in weight and low in cost.

In the case of the floppy disk apparatus intended to use the flexible disk, the position of the magnetic head relative to the disk must be accurately held to achieve mass storage and the like. The flexible disk can seemingly keep its flatness due to centrifugal force at the time of its high speed rotation. This enables the position of the magnetic head to be almost accurately kept relative to the disk. However, it is not assured that the flexible disk can always keep its flatness not to vibrate at the time of its high speed rotation.

This asked the following means to be conventionally employed to prevent the vibration of the disk. As disclosed in U.S. Pat. No. 4,419,704 and others, only one fixed Bernoulli is arranged to face the one surface of the disk with an extremely small clearance (or 100 μm, for example) interposed between the plate and the disk. Very little air flow is thus created between the Bernoulli plate and the disk at the time when the disk is rotated at high speed, so that this air flow can support the disk with a certain pressure to prevent the vibration of the disk. However, the disk contacts the Bernoulli plate at the time of its speed rotation. This causes the disk to be damaged and remarkably worn by the Bernoulli plate at the time when the disk is started and stopped.

U.S. Pat. No. 4,661,875 and others disclose another Bernoulli plate separated from the disk by an extremely small distance (or 100 μm, for example) and rotated together with the disk. In this case, too, the centrifugal force makes it possible to create very little air flow between the Bernoulli plate and the disk and in the radial direction of the disk to prevent the vibration of the disk. However, the disk rotates together with the Bernoulli plate and the inertia of the rotating matters becomes large. This makes it impossible to make the disk apparatus small in size. In addition, head access to both sides of the disk is left impossible, thereby causing mass storage not to be achieved.

Various kinds of means have been employed to prevent the disk from being vibrated, but they usually followed such drawbacks that the disk was worn, that the inertia of the rotating matters was large and that mass storage could not be achieved.

SUMMARY OF THE INVENTION

An object of the present invention is to provide an information storing disk apparatus intended to use a flexible information storing disk and capable of achieving mass storage and high speed access as well as making the device smaller in size, lighter in weight and lower in cost.

Another object of the present invention is to provide an information storing disk apparatus capable of surely preventing the vibration and wearing of the flexible disk.

According to the present invention, there can be provided an information storing disk apparatus for recording and reproducing information on and from a flexible information storing disk, said apparatus comprising: a means for rotating the flexible disk to cause centrifugal force to act on the disk in the radial direction thereof so as to keep the disk flat and also cause air flow to be created on both sides of the disk in the circumferential direction thereof; a pair of head sliders located to face both sides of the disk, respectively, at least one of the head sliders having a means for reading and writing information on and from the disk and each of the head sliders having an air bearing surface on which air force caused by the circumferential air flow acts to float the head slider from the disk; and means for supporting the paired head sliders, said means serving to apply their elastic force to each of the head sliders to put their elastic force against the air force, so that the head slider is kept floating from the disk by a predetermined distance when their elastic force is balanced with the air force applied.

According to the present invention, head sliders of the floating type for use with the hard disk apparatus are employed to face the flexible disk. The flexible disk can rotate at high speed, keeping its flatness due to the action of its centrifugal force. The head sliders can be thus floated from both sides of the disk by air force, thereby enabling heads for the hard disk apparatus to read and write information on and from the flexible disk. This prevents the flexible disk from being so damaged as seen in the conventional cases. The information storing disk apparatus according to the present invention can therefore achieve mass storage and high speed access as well as be made smaller in size, lighter in weight and lower in cast.

Further, the disk apparatus according to the present invention is provided with means for straightening air flow in the radial direction of the disk to suppress the occurrence of turbulent flow in the air flow and to surely prevent the vibration of the disk. The means have a pair of stationary straightening surfaces arranged to face both sides of the disk with a predetermined distance interposed between each of the straightening surfaces and its corresponding side of the disk to straighten the air flow in the radial direction of the disk.

Still further, assuming that the distance between each of the straightening surfaces and its corresponding side of the disk be represented by (s), the radius of the disk by (r), the rotating angular speed of the disk by ($\omega$) and the coefficient of viscosity of air by ($\gamma$), clearance Reynold's number can be expressed like $Re = (s, r \cdot \omega)/\gamma$.

According to the present invention, this clearance Reynolds number Re is set smaller than 700 (i.e., $0 < Re \leq 700$). The occurrence of turbulent flow can be thus suppressed in the air flowing in the radial direction of the disk, so that this air flow in the radial direction of the disk can be kept as laminar flow. Therefore, the flexible disk can keep its flatness due to its centrifugal force and its vibration can be suppressed by the laminar flow. This enables the disk to keep its flatness extremely stable.

Further, when the air bearing force acts on the air bearing surfaces of the pa red head sliders and they are floating from the disk, reactions of this air bearing force act on both sides of the disk in opposite directions. The balance of these reactions also enables the disk to keep its flatness extremely stable.

Still further, the present invention makes it unnecessary that the air flow supports the disk with a certain pressure as seen in the case of the Bernoulli plate. The present invention makes it necessary only to prevent the occurrence of turbulent flow in the air flowing in the radial direction of the disk. The distance between each of the straightening surfaces and its corresponding side of the disk can be thus made comparatively long (or it may be in a range of 400–800 $\mu$m, for example). This prevents the disk from being contacted with and damaged by the straightening surfaces at the time when the rotation of the disk is stopped.

Still further, the head sliders are located to face both sides of the disk in the case of the present invention. Heads access to both sides of the disk can be thus achieved, thereby making it easier to attain mass storage. In addition, the straightening plates are left stationary to make the inertia of the rotating body smaller. As the result, the rising time of the disk apparatus can be made shorter and the disk apparatus itself can be made smaller in size and lighter in weight.

BRIEF DESCRIPTION OF THE DRAWINGS

FIG. 6 is a graph showing the relation of clearance Reynolds number R relative to disk vibration;

FIG. 24A is a perspective view showing the disk apparatus whose head sliders are shifted from each other in the circumferential direction of the disk;

FIG. 24B is a plan roughly showing the head sliders shown in FIG. 24A;

DETAILED DESCRIPTION OF THE PREFERRED EMBODIMENTS

Figure 1A:
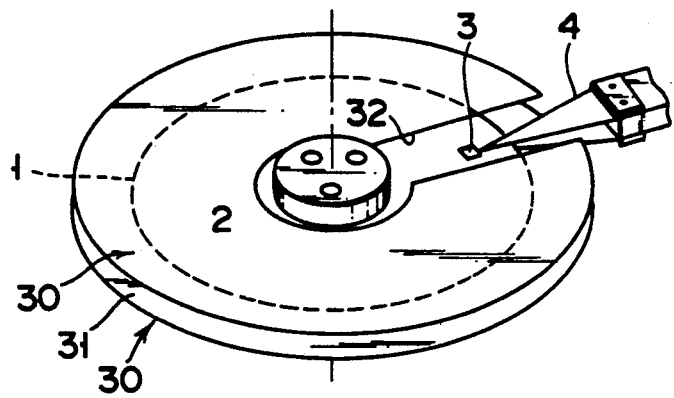
FIG. 1A is a perspective view showing a first example of the magnetic disk apparatus according to the present invention.
Figure 1B:
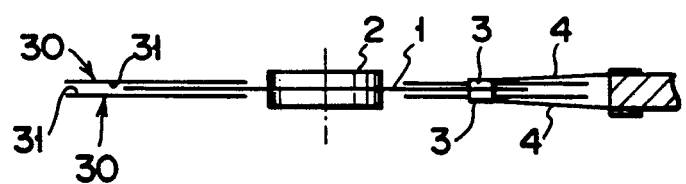
FIG. 1B is a sectional view showing the disk apparatus shown in FIG. 1A.

FIGS. 1A and 1B show a first example of the magnetic disk apparatus according to the present invention. Flexible magnetic or floppy disk 1 is fixed to hub 2 which is supported by a spindle motor (not shown). Recording areas are formed on both sides of disk 1 and a pair of magnetic head sliders 3 are located to face these both recording areas of disk 1. These paired head sliders 3 are supported by support system 4.

Figure 2:
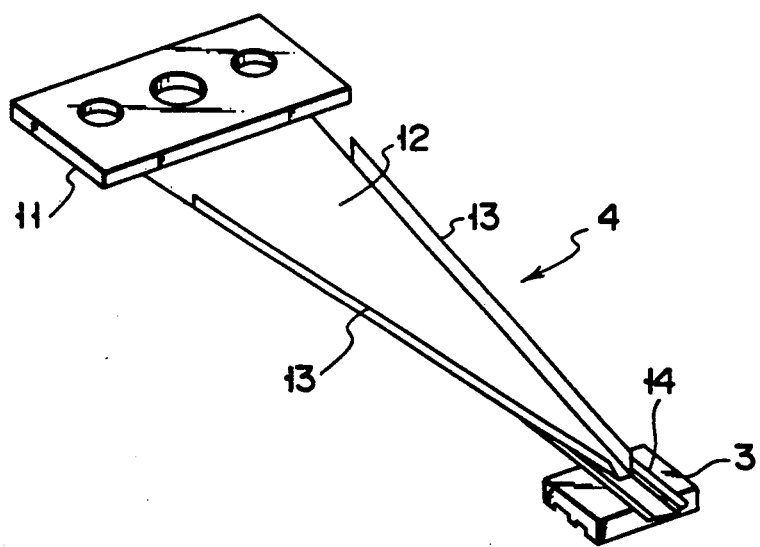
FIG. 2 is a perspective view showing a support system employed by the disk apparatus.

These head sliders 3 and support system 4 are same as those of the well-known hard disk apparatuss, as shown in FIG. 2. More specifically, support system 4 has load spring 12 extending from mount support 11. Load spring 12 is tapered forward and has erections 13 along both rims thereof to increase the rigidity thereof. Gimbal spring 14 is attached to the front end of load spring 12 and head slider 3 is attached to gimbal spring 14. This gimbal spring 14 prevents head slider 3 from being rotated, so that head slider 3 can be kept unchanged in its posture.

Figure 3A:
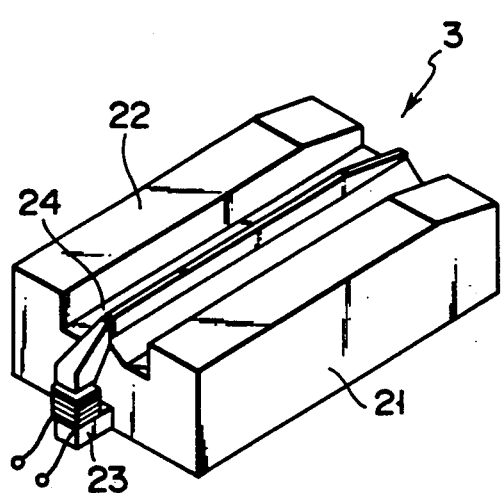
FIGS. 3A and 3B are perspective views showing head sliders employed by the disk apparatus.
Figure 3B:
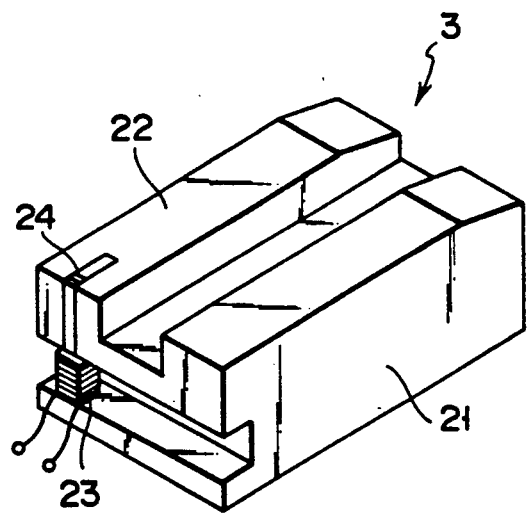

Head slider 3 may be of the well-known monolithic type, as shown in FIG. 3A, of the well-known composite type, as shown in FIG. 3B, or the thin film type (not shown). Whichever may be used, slider body 21 has air bearing surface 22 extending in the running direction of the head (or in the circumferential direction of the disk). In the case of head slider 3 of the monolithic type shown in FIG. 3A, slider body 21 is made of ferromagnetic material such as ferrite and magnetic head 23 is projected outside from the trailing edge of slider body 21. Magnetic gap 24 is formed adjacent to this trailing edge of slider body 21. In the case of head slider 3 of the composite type shown in FIG. 3B, slider body 21 is made of non-ferromagnetic material such as ceramic and magnetic head 23 is embedded in the trailing edge of slider body 21. Magnetic gap 24 is formed adjacent to the trailing edge of air bearing surface 22.

When disk 1 is kept stationary, air bearing surfaces 22 of paired head sliders 3 are contacted with both sides of disk 1 with a certain pressure. This contact pressure is determined by the urging force of load spring 12 which supports head slider 3. When disk 1 starts its rotating and the number of its rotation reaches a high speed of 3,600 rpm, for example, tension which is directed outward and in the radial direction of the disk is caused in the disk by centrifugal force. As the result, the flatness of the flexible disk can be kept by this tension.

Figure 4:
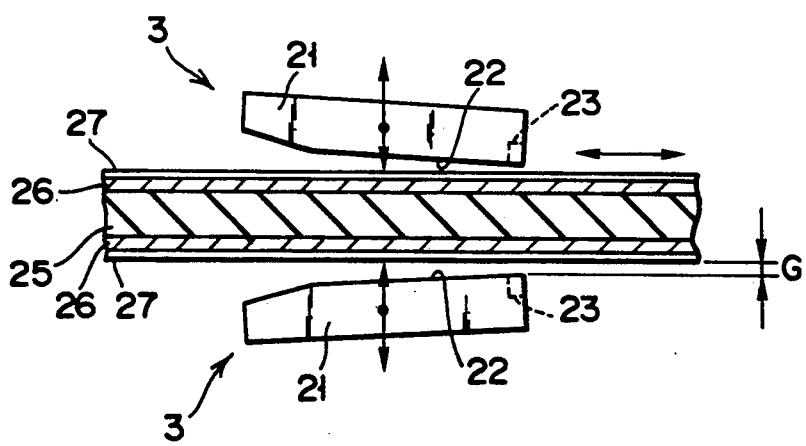
FIG. 4 shows the head sliders floating from the disk.

When the disk is running at this high speed, air flow is caused in the circumferential direction of disk 1 by the viscosity of air, as shown in FIG. 4. This air flow strikes against air bearing surfaces 22 of paired head sliders 3. As the result, air bearing force acts on air bearing surfaces 22, thereby causing paired head sliders 3 to float from disk 1. On the other hand, head sliders 3 are elastically pressed against disk 1 by load springs 12. When this pressing force balances the air bearing force, head sliders 3 float from the disk, each having a certain clearance relative to the side of disk 1. The air bearing force acts this time on air bearing surfaces 22, respectively, and reactions of this air bearing force act on both sides of disk 1 in opposite directions. The balance of these reactions enables disk 1 to be kept separated from each of paired head sliders 3 by same distance.

Disk 1 has film base 25, as shown in FIG. 4. A pair of magnetic layers 26 each made of ferrite, Ba ferrite or Co-Cr are formed on both sides of film base 25. Protection layer 27 made of silicon oxide is formed on each of magnetic layers 26. Distance or gap G of magnetic head 23 floating from disk 1 is set in view of the thickness of protection layer 27 and to provide sufficient recording and reproducing characteristics. More specifically, the elasticity of load spring 12 and the air bearing force acting against head slider 3 are set to make gap G kept or 0 to 1.0 μm, specially, 0.2 to 0.8 μm. Floating from disk 1 with this gap G, magnetic head 23 reads and writes information from and on disk 1.

As apparent from the above, the head sliders of the floating type for the hard disk apparatus are applied to the flexible disk in the case of the present invention. The flexible disk can be rotated at high speed by the action of centrifugal force, while keeping its flatness. The head sliders for the hard disk apparatus can be thus floated from the flexible disk by air force, thereby enabling the magnetic heads for the hard disk apparatus to read and write information on and from the flexible disk. This prevents the flexible disk from being broken as seen in the conventional cases. According to the disk apparatus of the present invention, therefore, mass storage and high speed access can be achieved. In addition, the disk apparatus can be smaller-sized with lighter weight and lower cost.

When it is rotated at high speed, flexible disk 1 can seemingly keep its flatness due to centrifugal force as described above. The positional relation of the magnetic heads relative to the disk can be thus kept almost accurate. However, there may be some possibility that flexible disk 1 cannot keep its flatness and thus be subjected to vibration at the time of its high speed rotation.

The following means is therefore employed to prevent the vibration of the disk. As shown in FIGS. 1A and 1B, a pair of first straightening or stationary plates 30 are arranged to face both sides of disk 1. That face of each of these straightening plates 30 which faces the side of disk 1 serves as straightening surface 31 and a certain clearance is defined between straightening surface 31 of plate 30 and the side of disk 1. The occurrence of turbulent flow in air flowing in the radial direction of the disk can be thus reduced, thereby enabling the air flow to be kept as laminar flow. As the result, the vibration of disk 1 can be prevented.

As shown in FIG. 1A, each of straightening plates 30 is shaped like a circle having such a size that covers almost the whole of flexible disk 1. Further, it has cutaway portion 32 which allows head slider 3 to move on disk 1 in the radial direction thereof.

Figure 5:
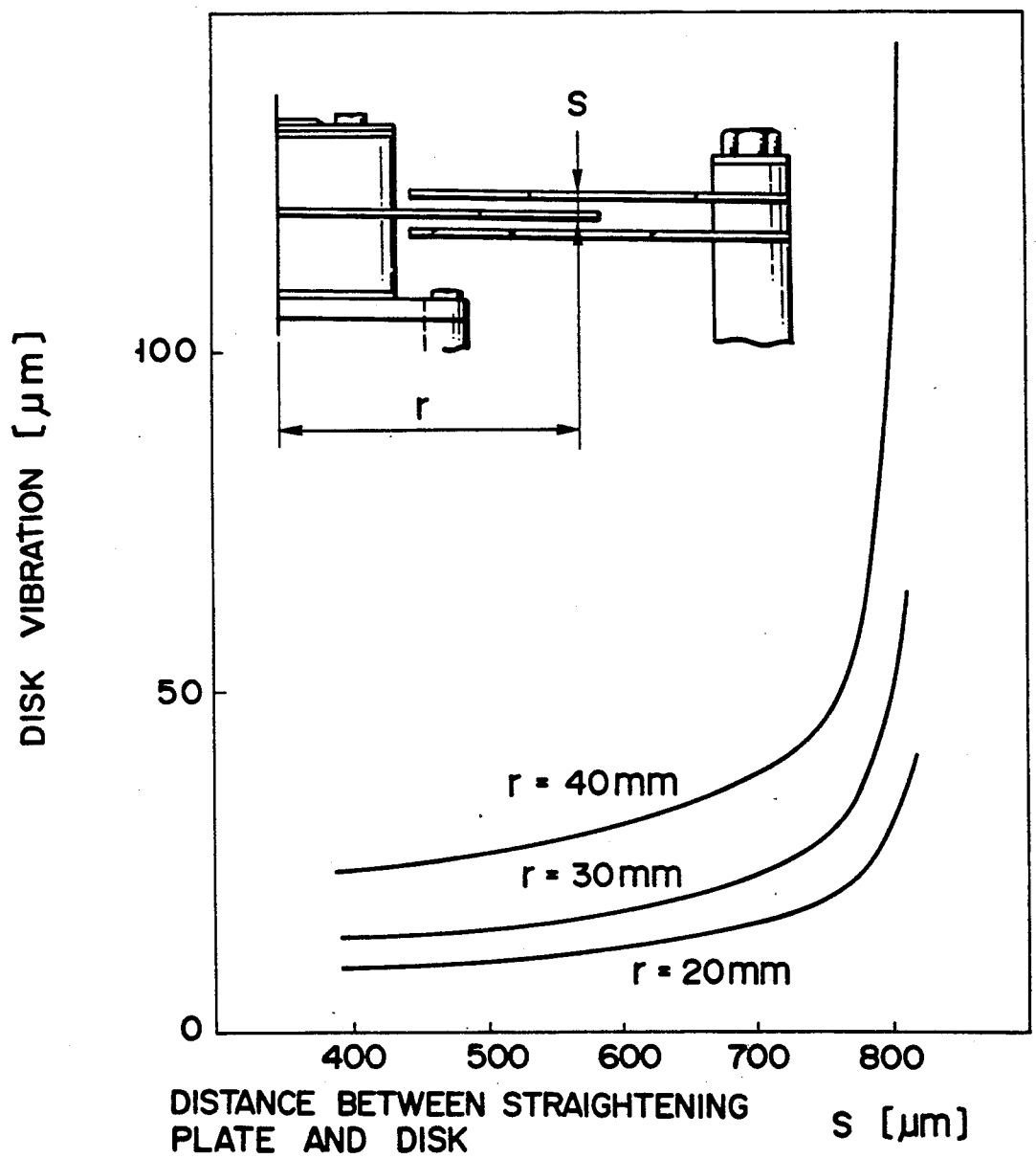
FIG. 5 is a graph showing the relation of disk vibration relative to distance (s) between each of the straightening plates and its corresponding side of the disk

Inventors sought adequate values of clearance (s) between disk 1 and straightening surface 31 by tests. The floppy disk of 3.5 inches was rotated at a high speed of 3,600 rpm. Clearance (s) between disk 1 and straightening surface 31 was varied at those positions where distance (r) starting from the center of disk 1 and extending in the radial direction thereof is 20 mm, 30 mm and 40 mm. When distance (s) is longer than about 750 μm, the vibration of disk 1 becomes quite large, as shown in FIG. 5, and it is not believed that the positional relation of the magnetic heads relative to the disk can be kept accurate. When it is shorter than about 700 μm, the vibration of disk 1 becomes comparatively small and it is believed that the positional relation of the magnetic heads relative to the disk can be so kept as not to deteriorate the recording and reproducing characteristics of the disk apparatus.

These values obtained by tests were converted to dimensionless numbers or clearance Reynold's numbers Re and the vibration of a disk whose size and rotation number were disregarded was examined. Assuming that the rotating angular speed of the disk be represented by $\omega$ and the coefficient of kinematic viscosity of air by $\gamma$, the clearance Reynold's number can be defined like $Re = (s \cdot r \cdot \omega)/\gamma$.

When clearance Reynold's number Re is larger than 700, the vibration of the disk becomes quite large, as shown in FIG. 6. It is believed that this is because turbulent flow is caused in air flowing in the radial direction of the disk. When it is smaller than 700 (i.e., $0<Re\leq 700$), the vibration of the disk becomes comparatively small. It is believed that this is because the occurrence of turbulent flow is reduced in air flowing in the radial direction of the disk and because air flows as laminar flow in the direction of the disk.

When the disk is rotated at high speed (or 3,600 rpm, for example) under the condition that clearance Reynold's number Re is smaller than 700 (i.e., $0<Re\leq 700$), the head sliders can float from the disk, keeping their positions certain relative to the disk because the vibration of the disk is reduced. Clearances between the magnetic gaps and the disk can be thus held certain and recording and reproducing characteristics of the magnetic gaps can be kept excellent. As described above, mass storage and high speed access can be thus surely realized even in the case of the magnetic disk apparatus intended to use the flexible disk.

According to the present invention, it is not needed that air flow supports the disk with a certain pressure as seen in the conventional case where the Bernoulli plates are used. It may be arranged in the case of the present invention that the occurrence of turbulent flow is prevented in air flowing in the radial direction of the disk. This enables the clearance of the straightening surface of each of the straightening plates relative to the disk to be made comparatively large (or 400–800 μm, for example). The disk can be thus prevented from being contacted with and broken by the straightening surfaces of the plates at the time of its being stopped.

Further, the head sliders are arranged to face both sides of the disk and head access can be thus made relative to both sides of the disk. This makes it easier to achieve mass storage. Furthermore, the straightening plates are not rotated and this enables the inertia of the rotating body to be made small. As the result, rise time can be made shorter and the disk apparatus can be smaller-sized with lighter weight.

Figure 7:
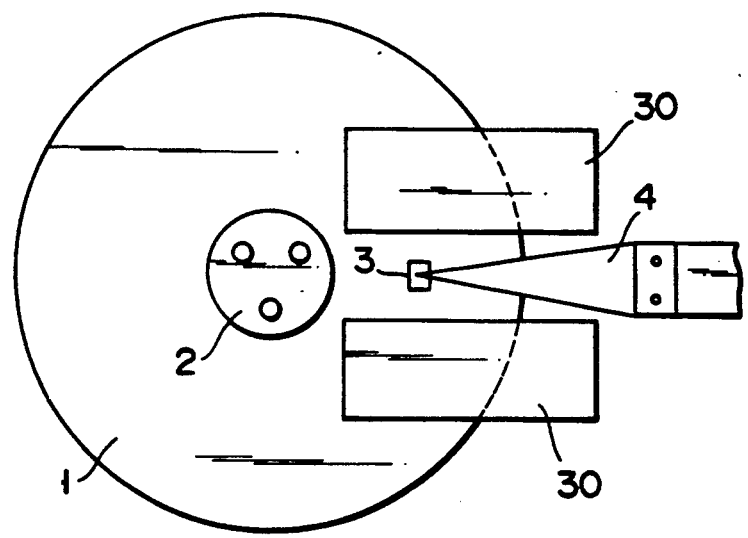
FIG. 7 is a plan showing a first variation of the first magnetic disk apparatus according to the present invention.

FIG. 7 shows a variation of the first magnetic disk apparatus according to the present invention. Head sliders 3 are moved in the radial direction of the disk by support system 4. In the case of this variation, straightening plates 30 are located on both sides the moving area of the head sliders. Namely, rectangular straightening plates 30 are located up- and down-streams the head sliders in the rotating direction of the disk. Air flowing in the radial direction of the disk can be held as laminar flow between the straightening plates and the disk even in this case, thereby preventing the vibration of the disk sufficiently in the vicinity of the head sliders. Even when the whole of the disk is not covered by the straightening plates, therefore, the positional relation between the head sliders and the disk can be held so accurate as to make the recording and reproducing characteristics quite excellent. Shape and position of each of straightening plates 30 are not limited to those of this variation but various changes can be made.

Figure 8:
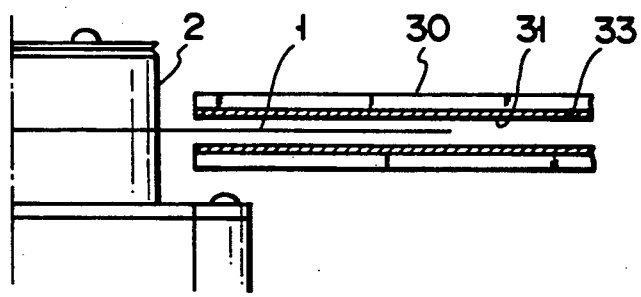
FIG. 8 is a side view showing a second variation of the first magnetic disk apparatus according to the present invention.

In the case of another variation of the magnetic disk apparatus shown in FIG. 8, liner 33 is formed on that face of each of straightening plates 30 which is opposite to the disk and that face of liner 33 which opposes to the disk serves as straightening surface 31. Even when disk 1 is remarkably vibrated by some disturbance, disk 1 can be protected by liner 33 and the damage of disk 1 can be prevented accordingly.

Figure 9:
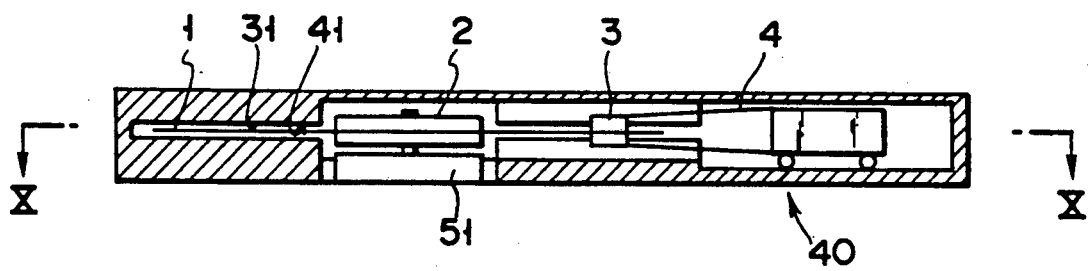
FIG. 9 is a sectional view showing a tightly-closed case assembly according to the present invention.
Figure 10:
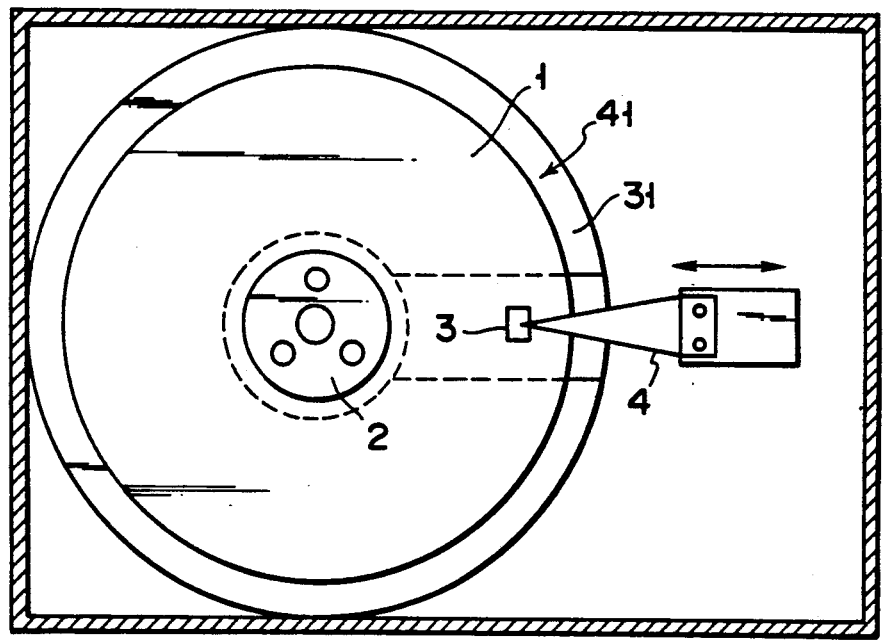
FIG. 10 is a sectional view taken along a line X—X in FIG. 9.

FIGS. 9 and 10 show closed case assembly 40 in which magnetic disk 1, head sliders 3 and support system 4 are housed. Disk 1 is designed to be rotated by motor 51, and support system 4 is designed to move in the radial direction of the disk in the case.

A pair of circular portions 41 which are opposed to the disk in the case at a certain distance are made comparatively thick to form straightening surfaces 31. In this case, therefore, air flowing in the radial direction of disk 1 can be kept as laminar flow between disk 1 and straightening surfaces 31 to thereby reduce the vibration of disk 1.

Figure 11:
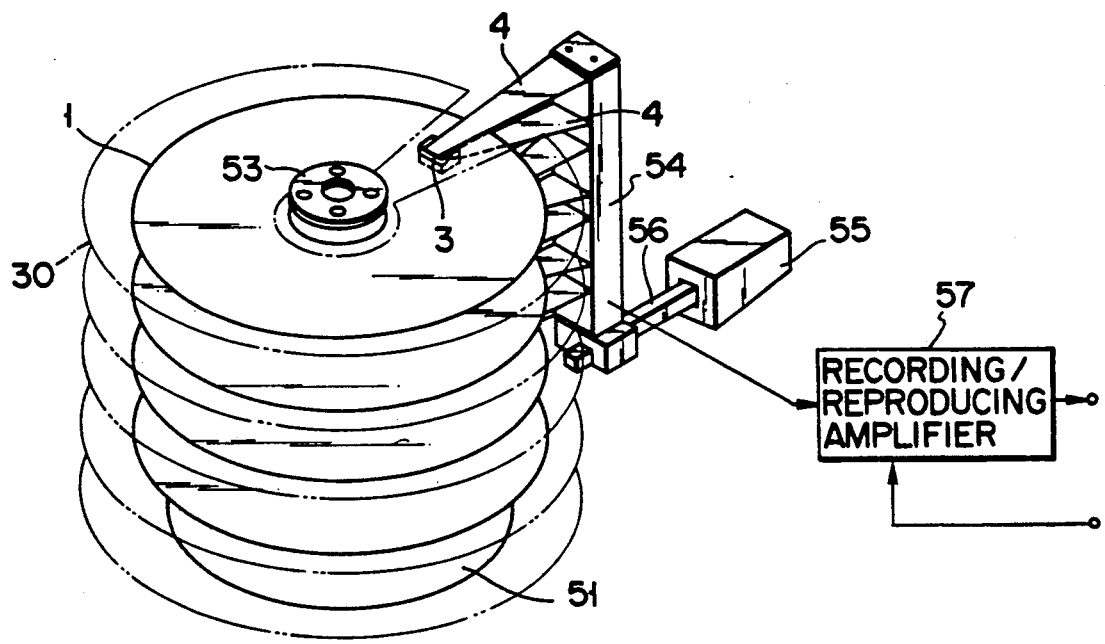
FIG. 11 is a perspective view showing a second example of the magnetic disk apparatus according to the present invention.
Figure 12:
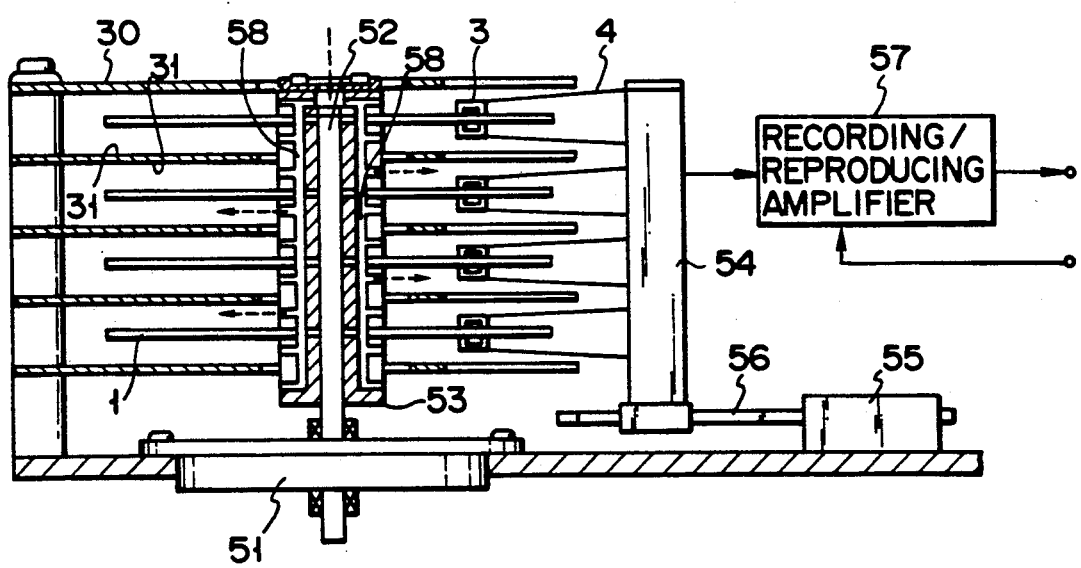
FIG. 12 is a sectional view showing the disk apparatus shown in FIG. 11.

FIGS. 11 and 12 show a second example of the magnetic disk apparatus according to the present invention, which is provided with plural disks. Plural flexible disks 1 are attached to rotating shaft 52, which extends from spindle motor 51, with a same distance interposed between adjacent disks. These disks 1 are fixed to rotating shaft 52 by hub 53. A pair of head sliders 3 are located opposite to both sides of each of disks 1 and supported by support system 4. Each of support system 4 is fixed to support means 54, which is fixed to driving shaft 56 extending from voice coil motor 55. When voice coil motor 55 is driven, support systems 4 are moved in the radial direction of the disks. Pieces of information are exchanged with those outside through recording and reproducing amplifier 57.

Straightening plate 30 is sandwiched between adjacent disks 1, respectively. Both sides of this straightening plate 30 serve as straightening surfaces 31 in this case. Straightening plates 30 are located above and under top and bottom disks 1, respectively.

In this case, therefore, air flowing in the radial direction of the disk between each of disks 1 and straightening surfaces 31 can be kept as laminar flow to thereby suppress the vibration of the disk. Because the disk apparatus has plural disks, mass storage can be increased to a great extent.

Passages 58 for feeding air, which is supplied through the top of hub 53, between each of disks 1 and straightening plates 30 are formed in hub 53. When the disks are rotated at high speed, air on each of the disks is moved outward in the radial direction of the disk due to centrifugal force. As the result, negative pressure is caused on the center portion of the disk. Air is therefore supplied into the space between each of the disks and straightening plates 30 through the passages 58 in hub 53 to eliminate this negative pressure and the air supplied then moves outward in the radial direction of the disk. The vibration of each of the disks can be further reduced accordingly. It is not necessarily needed that passages 58 are formed in hub 53 and even when no passage is formed, the vibration of each of the disks can be suppressed sufficiently.

Figure 13:
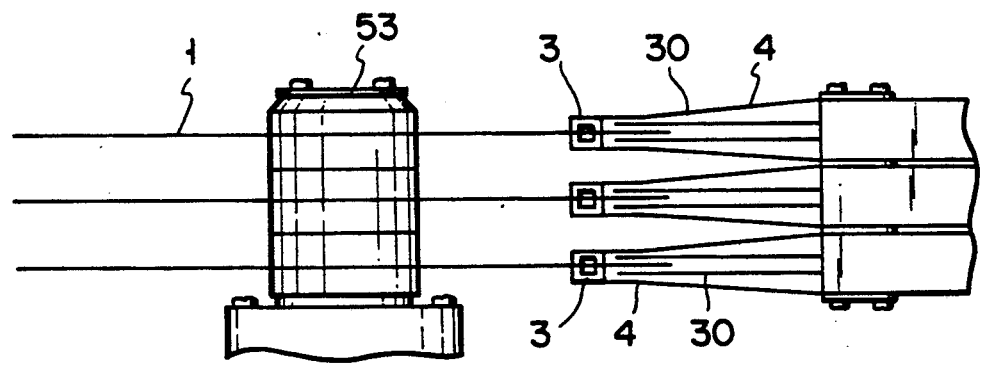
FIG. 13 is a side view showing a variation of the second magnetic disk apparatus.
Figure 14:
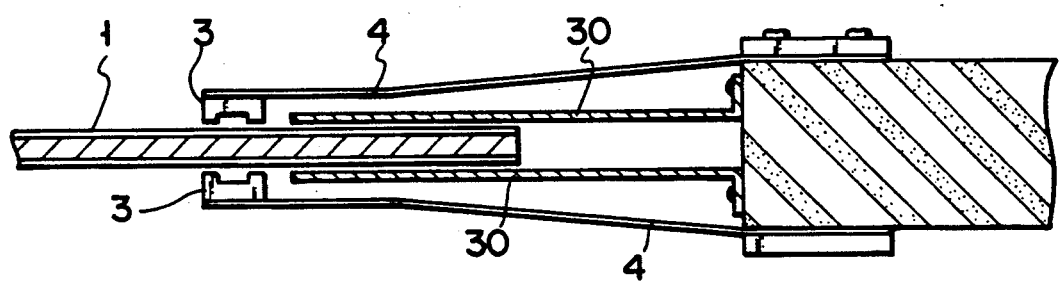
FIG. 14 is an enlarged sectional view showing the disk apparatus shown in FIG. 13.
Figure 15:
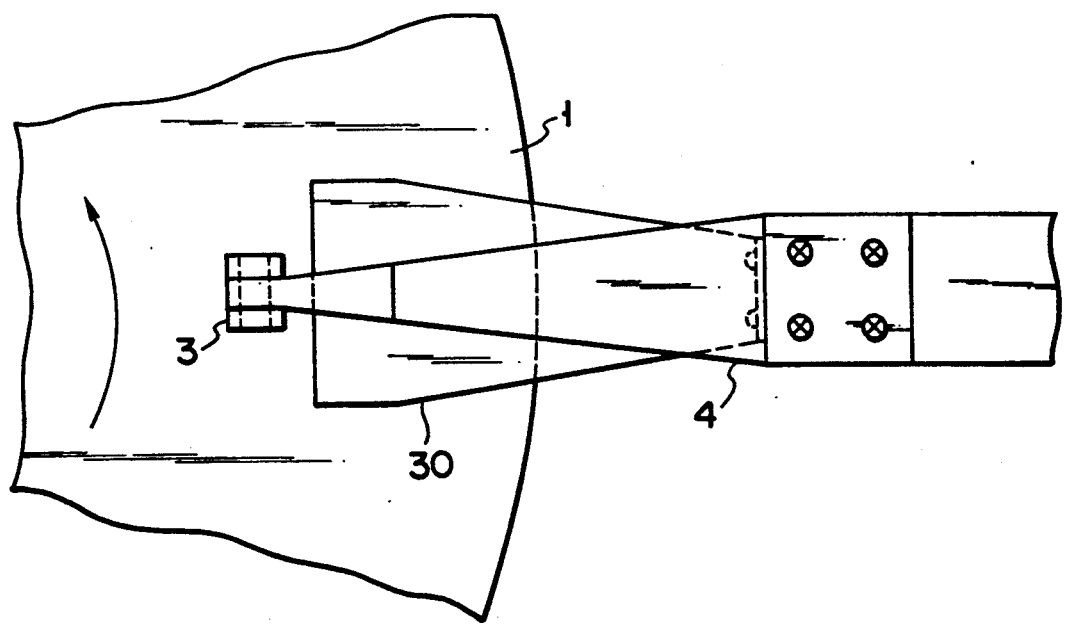
FIG. 15 is an enlarged plan showing the disk apparatus shown in FIG. 13.

FIGS. 13 through 15 show another variation of the disk apparatus. Straightening plates 30 each shaped like a fan are fixed to support system 4. At whatever position head sliders 3 may be in the radial direction of the disk, the vibration of that area of the disk which is located outward in the radial direction of head sliders 3 can be suppressed. Therefore, the shape or size of the straightening plate can be made smaller but the vibration of that area of the disk which must be kept flat can be fully reduced.

Figure 16:
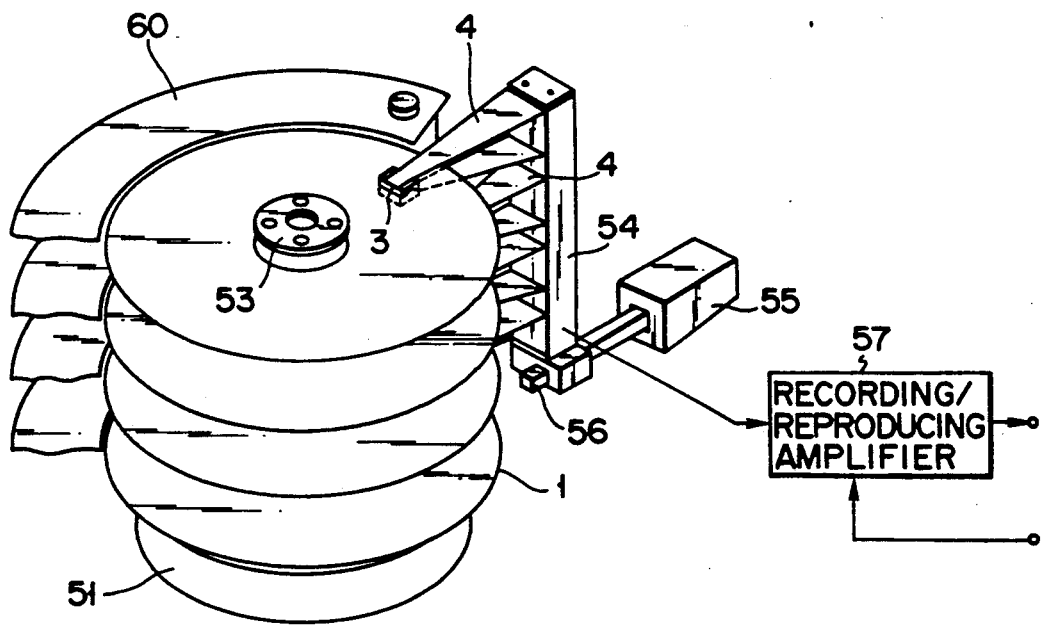
FIG. 16 is a perspective view showing a third example of the magnetic disk apparatus according to the present invention.
Figure 17:
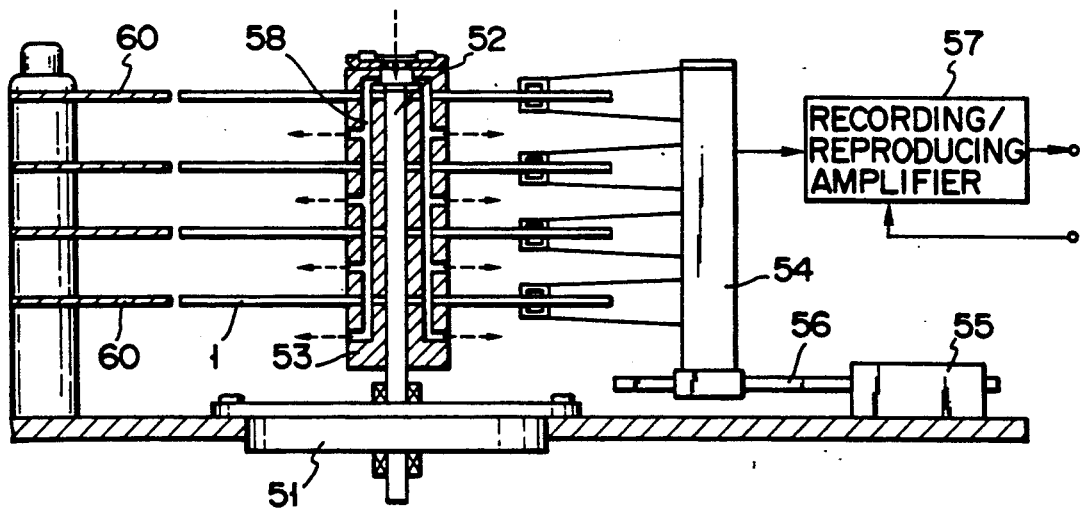
FIG. 17 is a sectional view showing the disk apparatus shown in FIG. 16.

FIGS. 16 and 17 show a third example of the magnetic disk apparatus according to the present invention, which is provided with second straightening plates. Each of second straightening or blocking plates 60 is ring-shaped and located on a same plane as the disk is, with a small clearance interposed between its inner rim and the outer rim of the disk. Passages 58 same as those shown in FIG. 12 are formed in hub 53. When each of the disks is rotated at high speed, therefore, negative pressure caused on the center portion of the disk in the radial direction thereof is eliminated by air supplied outward in the radial direction of the disk through passages 58. This air is allowed to further flow between straightening plates 60. This prevents turbulent flow from being caused in air flowing outward in the radial direction of the disk and on the outer rim portion thereof. The vibration of each of the disks can be prevented accordingly.

Figure 18:
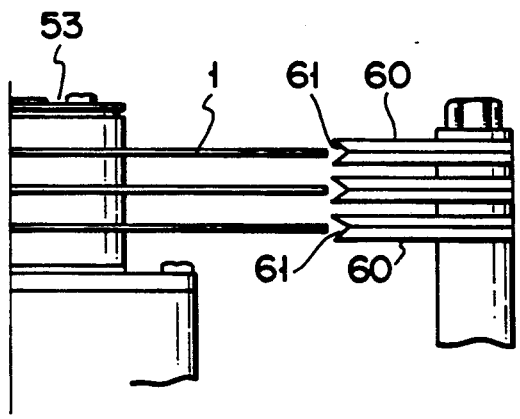
FIG. 18 is a side view showing a first variation of the third magnetic disk apparatus.

FIG. 18 shows a first variation of the second straightening plate. V-shaped groove 61 is formed on the inner rim side of each of straightening plates 60 and opposed to the outer rim side of each of the disks. Air flowing outward in the radial direction of the disk is stopped and divided in upward and downward directions by V-shaped groove 61 of the straightening plate. Pressures applied to the upper and lower sides of the disk are thus balanced with each other to suppress the vibration of the disk.

Figure 19:
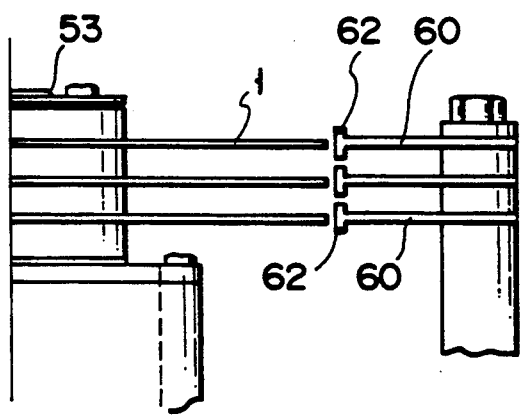
FIG. 19 is a side view showing a second variation of the third magnetic disk apparatus.

FIG. 19 shows a second variation of the second straightening plate. The inner rim of each of straightening plates 60 is shaped to have T-shaped wall 62. Air flowing outward in the radial direction of the disk strikes against T-shaped wall 62 and thus divided in upward and downward directions. Pressures applied to the upper and lower sides of the disk are balanced with each other, as seen in the first variation of the second straightening plate, to thereby reduce the vibration of the disk.

Figure 20:
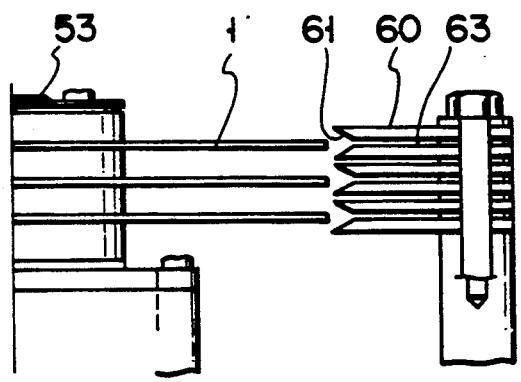
FIG. 20 is a side view showing a third variation of the third magnetic disk apparatus.

FIG. 20 shows a third variation of the second straightening plate. Air passage 63 is formed in each of second straightening plates 60. starting from the bottom of V-shaped groove 61 and extending outward in the radial direction of the straightening plate. Air flowing outward in the radial direction of the disk is allowed to smoothly flow into V-shaped groove 61 and through air passage 63. The air flow can be thus made extremely stable to further suppress the vibration of the disk.

Figure 21:
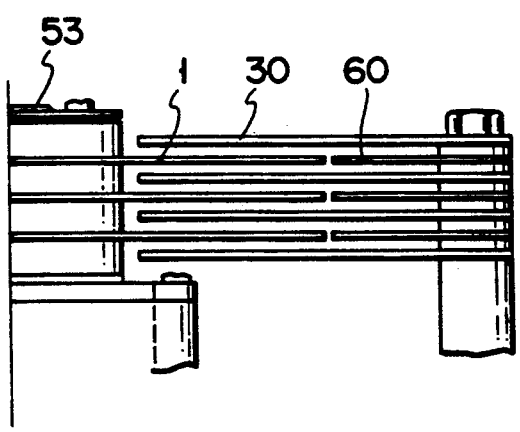
FIG. 21 is a side view showing a fourth variation of the third magnetic disk apparatus.

Both of first and second straightening plates 30 and 60 may be applied to the disk apparatus, as shown in FIG. 21. The vibration of each of the disks can be further reduced due to the combination effect of two kinds of the straightening plates applied.

Figure 22:
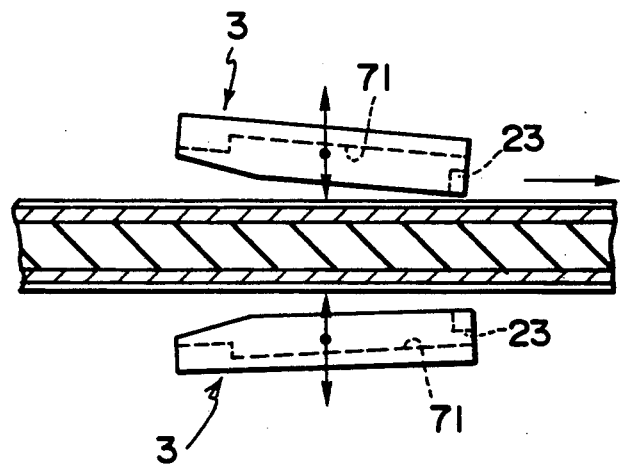
FIG. 22 shows the head sliders of the negative pressure type floating from the disk.

Positive pressure is applied to the paired head sliders in the above-described cases, but negative pressure may be applied to the paired head sliders, as shown in FIG. 22.

When disk 1 is kept stationary, gap between each of head sliders 3 and disk 1 is made comparatively large by the load spring (not shown). When disk 1 is rotated and air flow is caused in the circumferential direction of the disk, it is caused that surface 71 of each of head sliders 3 is under negative pressure. As the result, air force acts on these negative pressure surfaces 71 to force head sliders 3 toward the disk. When this air force is balanced with the force of the load spring, each of head sliders 3 is kept separated from disk by a certain distance. The disk is sucked this time upward and downward by the action of the above-described negative pressure. When these sucking forces are balanced with each other, the disk is held at a certain position between the paired head sliders. Even when disk 1 is kept stationary, disk 1 can be left untouched with head sliders 3 in this case. This prevents disk 1 from being damaged by head sliders 3 at the time when disk 1 is started and stopped.

Figure 23:
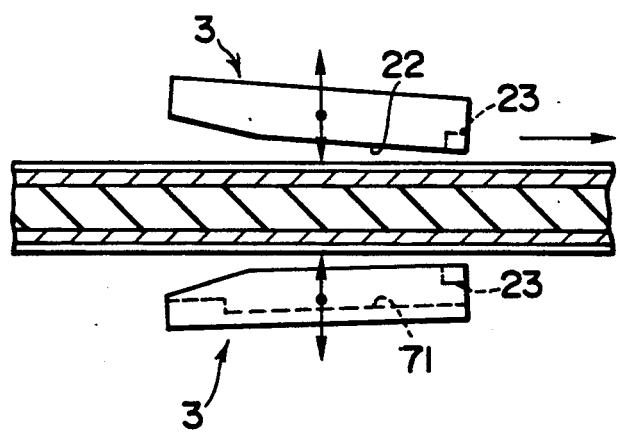
FIG. 23 shows the head sliders of the positive and negative pressures types floating from the disk.

One of head sliders 3 may be of the positive pressure type while the other of the negative pressure type, as shown in FIG. 23. When disk 1 is rotated, upper head slider 3 which is of the positive type is forced to separate from disk 1 while lower head slider 3 which is of the negative pressure type is forced to approach disk 1. Disk 1 is subjected to force which urges disk 1 toward lower head slider 3. When this force is balanced with the elasticity of the disk, therefore, the disk can be held at a predetermined position between the paired head sliders.

The paired head sliders are directed in the same direction relative to the circumferential direction of the disk in the case just described above. As shown in FIG. 24A, however, it may be arranged that the head sliders are a little shifted from each other in the circumferential direction of the disk and that they are directed in different directions. Their centers of gravity are shifted from each other in this case, as shown in FIG. 24B. Suction phenomenon between stationary disk 1 and head sliders 3 can be further suppressed in this case, as compared with the case where head sliders are directed in the same direction. Further, azimuth angles of both magnetic heads 23 are different from each other. While recording is being carried out by one of the magnetic heads, therefore, the occurrence of crosstalk can be reduced relative to the other of the magnetic heads.

Figure 25:
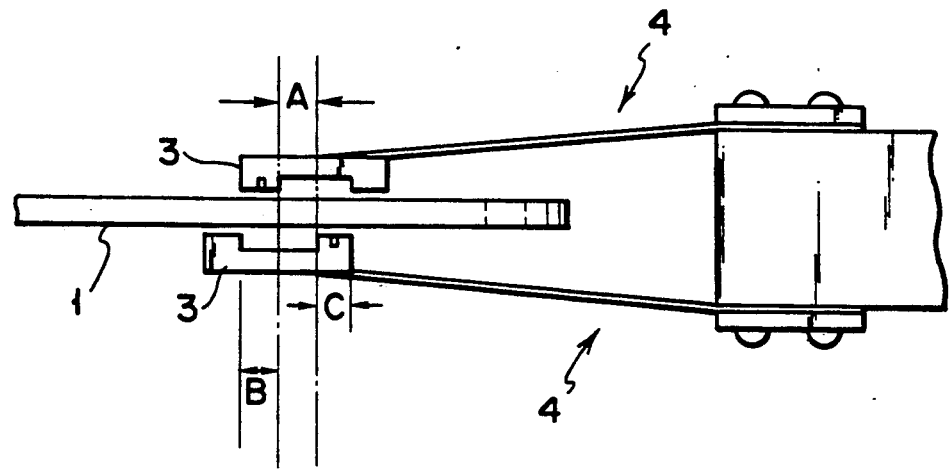
FIG. 25 is a side view roughly showing the disk apparatus whose head sliders are shifted from each other in the radial direction of the disk.

Same effects can be achieved by a case shown in FIG. 25. A pair of head sliders 3 are shifted from each other in the radial direction of the disk in this case. Assuming that the distance of the center line of on head slider shifted from that of the other head slider be represented by A, the half of groove width by B and the width of air bearing surface by C, the condition of $C<A<2B$ must be satisfied to allow the disk to be rotated without any vibration.

Figure 26:
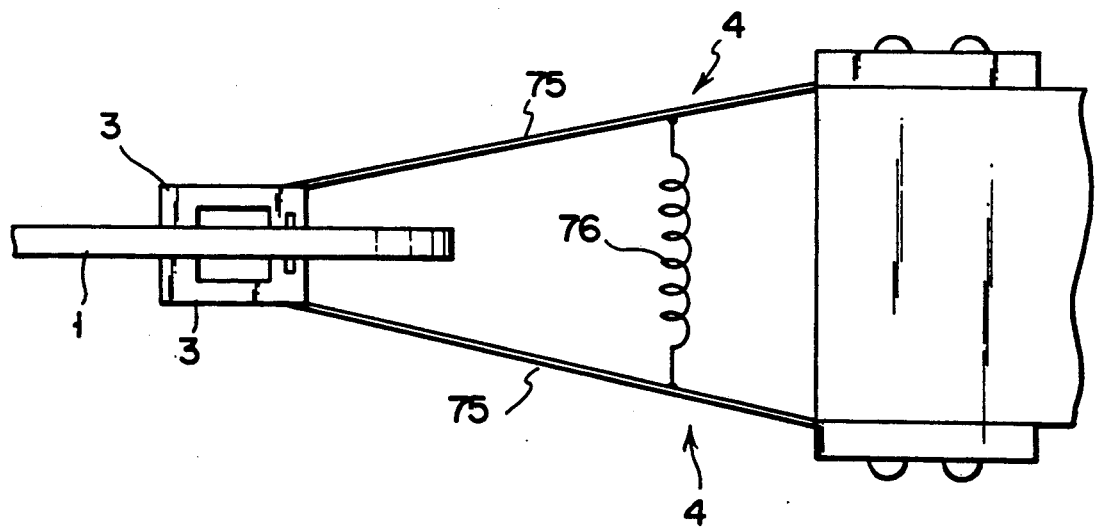
FIG. 26 is a side view showing the disk apparatus provided with an improved support system.

Paired rigid arms 75 of support system 4 which supports a pair of head sliders 3 may be connected to each other by spring 76, as shown in FIG. 26. Equal load is applied to each of paired head sliders 3 in this case. The gap of each of the magnetic heads floating from the disk can be thus made equal.

Figure 27:
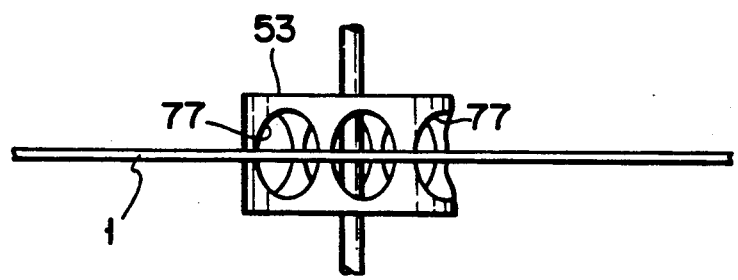
FIG. 27 is a side view showing the disk apparatus provided with an improved hub.

It may be arranged, as shown in FIG. 27, that disk-fixing hub 53 is provided with plural cut-away portions 77 and that the disk is supported at plural support points. This prevents the disk from being flexed when it is fixed to the hub. Further, air flow can be made smooth in the vicinity of the outer rim of the disk.

Figure 28:
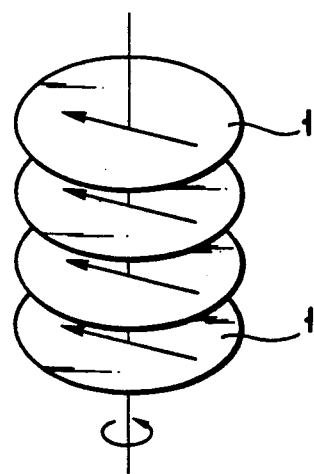
FIG. 28 is a perspective view showing improved disks.

In the case where plural disks 1 are arranged coaxial to one another, it may be arranged, as shown in FIG. 28, that anisotropies of mechanical characteristics of the disks are all directed to a same direction to align directions of their temperature expansions. The accuracy of tracking servo can be enhanced and recording density can be further enhanced, too, in the case.

Figure 29:
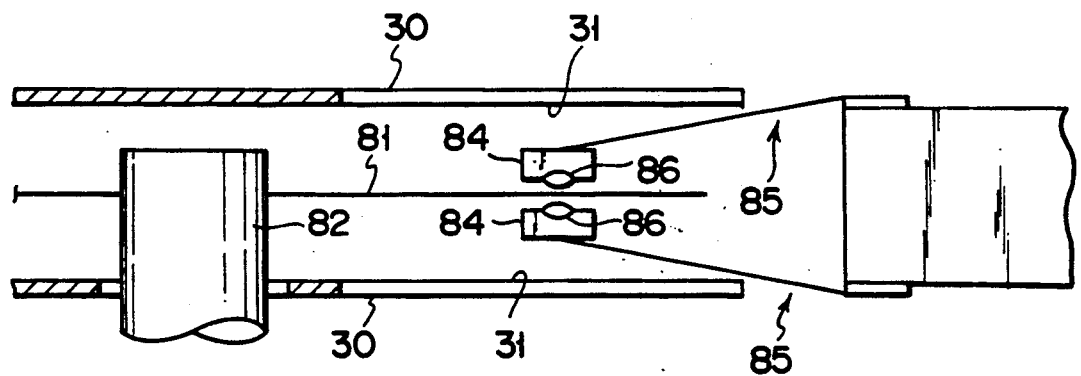
FIG. 29 is a side view roughly showing an optical disk apparatus according to the present invention.
Figure 30:
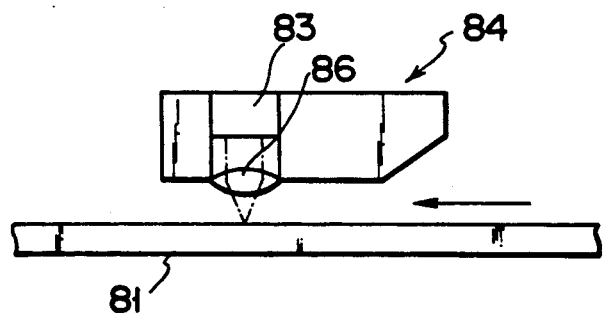
FIG. 30 shows an optical head slider viewed along an arrow A in FIG. 29.

FIGS. 29 and 30 show an example of the optical disk apparatus according to the present invention.

Optical disk 8 is also flexible and has recording layers on both sides thereof in the case of this optical disk apparatus. Optical disk 81 is fixed to hub 82 and optical head sliders 84 of the floating type each having optical head (or light receiving and emitting portion) 83 are supported by support systems 85 to move in the radial direction of the disk. When optical disk 81 is rotated, therefore, each of optical sensors 84 float from optical disk 81, gap G being kept no more than 5.0 $\mu$m. Laser beam is shot from the light emitting portion and focused onto optical disk 8 through lens 86, and laser beam reflected is detected by the light receiving portion. Information is thus reproduced and recorded from the optical disk.

In the case of this optical disk apparatus, too, first straightening plates 30 are located, separating from both sides of the disk by a predetermined distance. respectively, and clearance Reynold's number Re is set smaller than 700 (i.e., $0 < Re \leq 700$). The occurrence of turbulent flow is thus suppressed in air flowing outward in the radial direction of the disk and the air flow is kept as laminar flow accordingly. The vibration of the optical disk can be thus reduced even in the case of this optical disk apparatus. This enables mass storage and high speed access to be surely realized even in the case of this optical disk apparatus.

It is not needed that both of the paired floating head sliders have optical heads, but it may be arranged in the case where the disk has the recording layer only on one side thereof that one of the optical disks serves as a dummy one and has the floating characteristic same as that of the other optical disk. In a case where the optical disk is of the transmission type, it may be arranged that one of the heads has the light emitting portion while the other has the light receiving portion and that both have the same floating characteristic.

As apparent from the above, the present invention can be applied to the optical disk apparatus intended to use flexible optical disks as well as the magnetic disk apparatus intended to use flexible magnetic disks. Therefore, the present invention can be applied to various kinds of information storing disk apparatuses intended to use flexible information storing disks.

What is claimed is:

1. An information storing disk apparatus comprising:
   a flexible disk for storing reproducing information;
   a means for rotating said disk to cause centrifugal force to act on said disk in a radial direction thereof, for keeping said disk flat, and for creating air flow on both sides of said disk in a circumferential direction thereof wherein air flow is created in the radial direction of said disk when said disk is rotated;
   a pair of head sliders located to face both sides of said disk, respectively, at least one of the head sliders having means for reading and writing information on and from said disk and each of said head sliders having air surface on which air force caused by a circumferential air flow acts to float said head slider from said disk;
   supporting means for supporting said pair of head sliders, said supporting means serving to apply elastic force of said supporting means to each of said head sliders against the air force, and keeping said head sliders floating from said disk by a predetermined distance when the elastic force is balanced with the air force applied;
   a straightening means for straightening the air flow in the radial direction of said disk, and for reducing the occurrence of turbulent flow in the air flow, said straightening means being located to face both sides of said disk with a predetermined distance interposed between each of said straightening means and a corresponding side of said disk, and having a pair of stationary straightening surfaces each serving to straighten the air flow in the radial direction of said disk to prevent an occurrence of turbulent flow between each of stationary straightening surface and said disk, said straightening means having a pair of first stationary plates arranged to face both sides of said disk and said straightening surface being formed on that face of each of said first stationary plate which faces said disk, each of said first stationary plates being shaped like a circle having such a side that covers said disk, and having a cut-away portion for defining a space in which each of said head sliders can move on said disk in a radial direction thereof.

* * * * *